3,651,061
2,3-DIHYDRO-2-(1-NAPHTHYL)-4(1H)QUINAZO-
LINONE AND THE 6-CHLOROANALOG
Ronald J. Ericsson, Kalamazoo, Mich., and Ernst Reif,
Heidenheim an der Brenz, Germany, assignors to
Ernst Reif, Heidenheim an der Brenz, Germany
No Drawing. Filed Apr. 20, 1970, Ser. No. 30,267
Int. Cl. C07d 51/48
U.S. Cl. 260—251 QA                2 Claims

ABSTRACT OF THE DISCLOSURE 2,3 - dihydro - 2 - (1-naphthyl) - 4(1H)quinazolinone and the 6 - chloroanalog are provided by this invention. These compounds are useful in controlling fertility in warm-blooded male animals.

BACKGROUND OF THE INVENTION

Heretofore, twenty-three 2 - aryl - 2,3-dihydro-4(1H)-quinazolinones were prepared and a number of those were found highly active in inhibiting the multiplication of Earle's L cells growing in suspension. Nine had an $ED_{50} \leq 6$ μg./ml. and of these two had an $ED_{50}=0.1$ μg./ml. Yale and Kalkstein, J. Med. Chem. 10:334–336 (1967). U.S. 3,463,778 describes 2,3-dihydro-4(1H)-quinazolinones as active in inhibiting multiplication of Earle's L cell line of mouse fibro blasts growing in suspension.

However, until the present invention, none of the prepared compounds was a 2-(1-naphthyl) or a 2-(2-ethoxyphenyl) compound. And none has been reported to be useful in controlling fertility in warm-blooded male animals.

SUMMARY OF THE INVENTION

This invention provides compounds represented by the formula

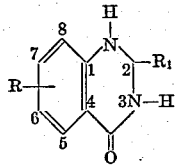

where R is selected from the group consisting of hydrogen, lower alkyl having 1 to 5 carbon atoms, inclusive, lower alkoxy having 1 to 5 carbon atoms, inclusive, halogen and trifluoromethyl, and $R_1$ is 1-naphthyl or 2-ethoxyphenyl. The compounds are biologically active in controlling fertility in warm-blooded male animals.

DESCRIPTION OF THE PREFERRED EMBODIMENTS

The compounds of Formula 1 supra are prepared by reacting anthranilamide or a properly substituted anthranilamide with 1-naphthaldehyde or 2-ethoxybenzaldehyde, for example, by anil formation in ethanol between the anthranilamide and the aldehyde followed by base-catalyzed cyclization such as with dilute aqueous sodium hydroxide.

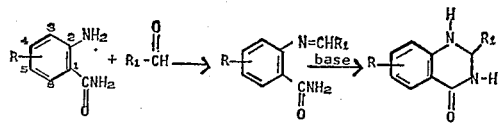

In somes cases acid catalysis, such as with dilute hydrochloric acid, also causes cyclization. Alternatively, the compounds of this invention are prepared by the reaction of the proper anthranilamide and the aldehyde in a solvent such as benzene, toluene, xylene, or chlorobenzene, employing a catalytic amount of p-toluenesulfonic acid and with a provision for the removal of the water formed in the reaction. Yet another alternative is to react the proper anthranilamide and the aldehyde in ethanol saturated with hydrogen chloride.

Both the 1-naphthaldehyde and the 2-ethoxybenzaldehyde are well-known commercially available compounds. Anthranilamide and the substituted anthranilamides required to prepare the present compounds are known or can be conveniently prepared by known methods. For example, all of the isomeric methyl and methoxy compounds are known reactants reported in the literature. Other substituted anthranilamides used in preparing the inventive compounds are prepared by the reaction of ammonia on the appropriate isatoic anhydride. J. Org. Chem. 18:1427 (1953).

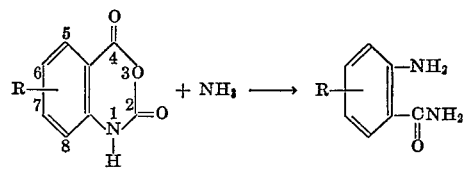

The required isatoic anhydrides are obtained by oxidation of the corresponding isatins with chromic acid in acetic acid in accordance in the procedure of J. Chem. Soc. 2916 (1957). They may also be prepared from the required anthranilic acids and phosgene in accordance with the reference "Heterocyclic Compounds with Indole and Carbazole Systems," Interscience Publishers, Inc., New York, 1954, pp. 111–116.

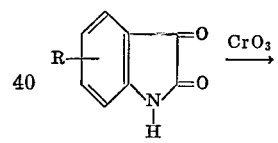

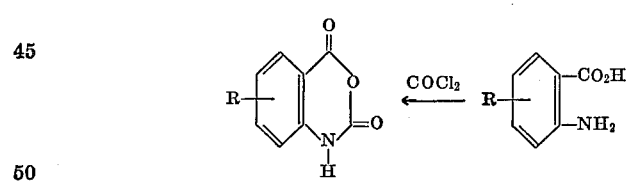

The isatins are prepared by the Sandmeyer procedure involving the reaction of an aniline, chloral hydrate and hydroxylamine to form an isonitrosoacetanilide which is thereafter converted to an isatin on treatment with concentrated sulfuric acid in accordance with "Heterocyclic Compounds, etc." ibid.

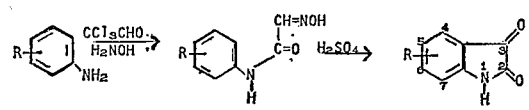

The use of a para-substituted aniline results in the preparation of a 5-substituted isatin. The use of an orthosubstituted aniline results in the preparation of a 7-substituted isatin. The use of a meta-substituted aniline results usually in a mixture of 4 and 6-substituted isatins although one may be exclusively formed in accordance with J. Org. Chem. 21:169 (1956). Since m-trifluoromethylaniline produces the 4-isomer exclusively, a differing procedure has been used to make the 6-trifluoromethyl substituted isatin in accordance with J. Org. Chem. 28:3580 (1963).

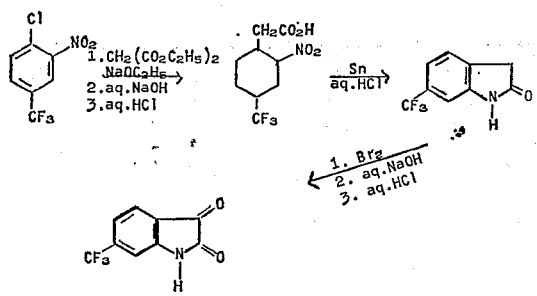

Examples of lower alkyl having 1 to 5 carbon atoms, inclusive, are methyl, ethyl, propyl, butyl, pentyl and isomeric forms thereof. Examples of lower alkoxy having 1 to 5 carbon atoms, inclusive, are methoxy, ethoxy, propoxy, butoxy, pentoxy and isomeric forms thereof. Examples of halo are bromo, chloro and fluoro.

Especially preferred compounds in accordance with this invention are the compound wherein R is hydrogen and $R_1$ is (1-naphthyl), the compound wherein R is 6-chloro and $R_1$ is (1-naphthyl) and the compound wherein R is hydrogen and $R_1$ is (2-ethoxyphenyl).

PREPARATION NO. 1 m-Ethyl-α-isonitrosoacetanilide

Into a flask are placed 73 gm. of chloral hydrate and 1000 ml. of water. To this solution are then added, in order: 1100 gm. of crystallized sodium sulfate; a solution of 49.3 gm. of m-ethylaniline in 250 ml. of water to which 41.4 gm. of concentrated hydrochloric acid (Sp. gr. 1.19) is added to dissolve the amine; and, finally, a solution of 100 gm. of hydroxylamine hydrochloride in 400 ml. of water. The temperature is raised to and held at boiling for 5 minutes. The solution is cooled and the precipitate is collected by filtration to give 64.3 gm. (82%), M.P. 133–135°. Recrystallization from aqueous methanol with the aid of activated charcoal gives white crystals, M.P. 145–145.5°.

Analysis.—Calc'd for $C_{10}H_{12}N_2O_2$ (percent): C, 62.5; H, 6.25; N, 14.6. Found (percent): C, 62.9    H, 6.63; N, 14.9.

PREPARATION NO. 2

4-ethylisatin

To a solution of 86% sulfuric acid maintained at 60–65° is added 64.3 gm. of m-ethyl-α-isonitrosoacetanilide. External cooling is applied at this stage so that the reaction can be carried out more rapidly. After the addition is complete, the reaction solution is maintained at 60–65° for 10 minutes and then cooled to room temperature. The solution is poured upon ten to twelve times its volume of cracked ice and the precipitate is collected and then dissolved in 500 ml. of water and 200 ml. of 10% sodium hydroxide by heating on a steam bath. The solution is clarified with activated charcoal by filtration through diatomaceous earth. The cooled solution is acidified to pH 4 with acetic acid. The 4-ethylisatin is collected and washed with water; yield, 13.8 gm. (24%), M.P. 134–135° with softening at 125°. Recrystallization from 50% methanol gives orange crystals, M.P. 139–140°.

Analysis.—Calc'd for $C_{10}H_9NO_2$ (percent): C, 68.6; H, 5.14; N, 8.00. Found (percent): C, 68.2; H, 5.41; N, 8.17.

PREPARATION NO. 3

5-ethylisatoic anhydride

To a stirred solution of 11.2 gm. of 4-ethylisatin in 110 ml. of acetic acid warmed to 60° is added 37 gm. of chromic anhydride in portions over a period of 15 minutes maintaining the temperature at 70–75° by occasional cooling. The solution is maintained at this temperature for an additional one hour, then poured into 410 ml. of water.

The product is collected and washed well with water; yield, 5.1 gm. (42%), M.P. 196–198°. Recrystallization of a sample from toluene gives nearly white crystals, M.P. 197–198°.

Analysis.—Calc'd for $C_{10}H_9NO_3$ (percent): 62.9; H, 4.71; N, 7.34. Found (percent): C, 62.9; H, 5.00; N, 7.51.

PREPARATION NO. 4

2-amino-6-ethylbenzamide

A mixture of 4.8 gm. of 5-ethylisatoic anhydride, 24 ml. of acetone, and 2.7 ml. of 28% ammonia water is refluxed for 40 minutes during which solution takes place and a solid separates. After the addition of an additional 2.7 ml. of ammonia water, the mixture is stirred and heated under reflux for 30 minutes more when solution is again complete. The solution is evaporated to dryness in vacuo to give the 2-amino-6-ethylbenzamide.

EXAMPLE 1

2-(1-naphthyl)-6-chloro-2,3-dihydro-4(1H)-quinazolinone

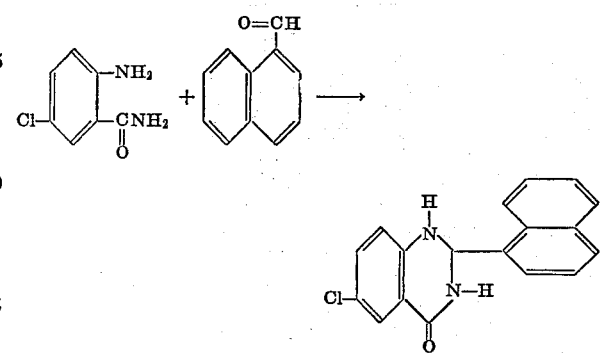

A mixture of 10 gm. (0.0586 mole) of 2-amino-5-chlorobenzamide, 10 gm. (0.064 mole) of 1-naphthaldehyde, and 100 ml. of alchol is refluxed for 1 hour. Then 0.5 gm. of NaOH in 5 ml. of water is added. A solid begins separating immediately. The refluxing is continued for 1.25 hours. After cooling in an ice bath the solid is collected by filtration, washed with water, and dried giving 16.6 gm. of buff solid. Crystallization from acetone-Skellysolve B gives 12.7 gm. (70%) of ivory prisms, M.P. 183–185° C. Recrystallization from aqueous ethanol affords ivory needles, M.P. 184–185°.

Analysis.—Calc'd for $C_{18}H_{13}ClN_2O$ (percent): C, 70.00; H, 4.24; Cl, 11.48. Found (percent): C, 70.16; H, 4.67; Cl, 11.59.

EXAMPLE 2

2-(1-naphthyl)-2,3-dihydro-4(1H)-quinazolinone

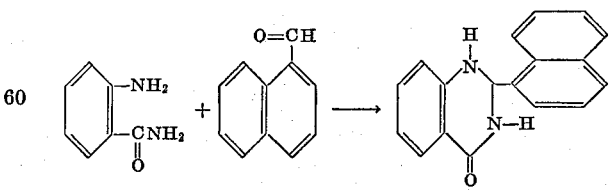

A mixture of 40.8 gm. (0.3 mole) of anthranilamide and 46.8 gm. (0.3 mole) of 1-naphthaldehyde in 300 ml. of absolute ethanol is refluxed for 0.5 hour. Then 2.4 gm. of NaOH in 30 ml. of water is added and the refluxing is continued for 0.5 hour. After cooling, the solid is collected by filtration and washed with water. Crystallization from aqueous ethanol gives 61.5 gm. (75%) of white prisms, M.P. 187–189° C.

Analysis.—Calc'd for $C_{18}H_{14}N_2O$ (percent): C, 78.81; H, 5.14; N, 10.21. Found (percent): C, 78.89; H, 4.96; N, 9.90.

Substitution of the 1-naphthaldehyde by 2-ethoxybenzaldehyde provides 2-(2-ethoxyphenyl)-2,3-dihydro-4(1H)-quinazolinone as final product.

EXAMPLE 3

2-(1-naphthyl)-5-ethyl-2,3-dihydro-4(1H)-quinazolinone

The 2-amino-6-ethylbenzamide of Preparation No. 4 is reacted as in Example 1 with 1-naphthaldehyde to provide the stated compound, M.P. 142–143.5°.

EXAMPLE 4

2-(ethoxyphenyl)-5-ethyl-2,3-dihydro-4(1H)-quinazolinone

The 2-amino-6-ethylbenzamide of Preparation No. 4 is reacted as in Example 2 with 2-ethoxybenzaldehyde to provide the stated compound.

EXAMPLE 5

Other substituted quinazolinones

Substituting the other substituted anthranilamides, illustratively, 2-amino-4-ethoxybenzamide or 2-amino-3-trifluoromethylbenzamide provides the corresponding quindro-4(1H)-quinazolinone, 2-(ethoxyphenyl)-8-trifluoro-4(1H)-quinazolinone, 2-(1-naphthyl)-7-ethoxy-2,3-dihydro-4(1H)-quinazolinon, 2-(ethoxyphenyl)-8-trifluoromethyl-2,3-dihydro-4(1H)-quinazolinone, or 2-(ethoxyphenyl)-7-ethoxy-2,3-dihydro-4(1H)-quinazolinone upon reaction with 1-naphthaldehyde or 2-ethoxybenzaldehyde, respectively.

Methods are available for evaluating the suitability of the compounds of this invention in controlling fertility of warm-blooded animals. Illustratively, standard adult rats are dosed orally with predetermined dosages of a compound, daily dosages being administered for 14 days at 15 mg. per rat. The treated males are mated weekly with receptive standard adult female rats. The number of implants in the females at subsequent autopsy at various weeks is determined as an index of inhibition of fertility. Autopsies are at various weeks to allow concurrent weekly sacrifice of treated and control males to gather data on their organ and body weight and histology. The table gives the results with 2-(1-naphthyl)-2,3-dihydro-4(1H)-quinazolinone at the stated dosage. Similar findings are made with the other compounds of this invention. Under the conditions of this method of evaluation, fertility of treated males returns in time.

TABLE.—FERTILITY OF MALE RATS TREATED DAILY ORALLY FOR TWO WEEKS WITH 15 MG./RAT

| Group | Rat No. | 1 | 2 | 3* | 4 | 5 | 6 | 7 | 8 |
|---|---|---|---|---|---|---|---|---|---|
| 2-(1-naphthyl)-2,3-dihydro-4(1H)-quinazolinone | 1 | 14 | 9 | | | | | | |
| | 2 | 5 | 0 | 0 | 0 | 0 | | | |
| | 3 | 13 | 0 | 0 | 0 | | | | |
| | 4 | 15 | 1 | 1 | 0 | 0 | 0 | X | 0 |
| | 5 | 9 | 0 | 0 | X | 0 | 0 | 0 | |
| | 6 | 16 | 13 | 2 | 0 | 0 | 0 | | |
| | 7 | 12 | Killed | (Sick) | | | | | |
| | 8 | 13 | X | 1 | | | | | |
| Control | 1 | 14 | 13 | 11 | | | | | |
| | 2 | 10 | 11 | | | | | | |
| | 3 | 14 | 11 | 14 | 6 | | | | |
| | 4 | 15 | 11 | 0 | 13 | 6 | | | |
| | 5 | 12 | X | 10 | 13 | 8 | 12 | | |
| | 6 | 15 | X | X | 13 | 8 | 0 | 12 | |
| | 7 | 0 | X | 14 | 13 | 12 | X | 8 | 17 |
| | 8 | 8 | 0 | 14 | X | X | 15 | 0 | 15 |

*=Start of the third week is post-treatment.
X=Did not mate.

We claim:

1. 2,3-dihydro-2-(1-naphthyl)-4(1H)-quinazolinone.
2. 2,3-dihydro-2-(1-naphthyl)-6-chloro-4(1H)quinazolinone.

References Cited

Smith et al.: C.A. 51, 13869h (1957).
Toyoshima et al.: C. 63, 7009g (1965).

ALEX MAZEL, Primary Examiner

R. V. RUSH, Assistant Examiner

U.S. Cl. X.R.

424—251

UNITED STATES PATENT OFFICE
CERTIFICATE OF CORRECTION

Patent No. 3,651,061          Dated March 21, 1972

Inventor(s) Ronald J. Ericsson and Ernst Reif

It is certified that error appears in the above-identified patent and that said Letters Patent are hereby corrected as shown below:

Column 5, lines 25-28, "dro-4(1H)-quinazolinone, 2-(ethoxyphenyl)-8-trifluoro-4(1H)-quinazolinone, 2-(1-naphthyl)-7-ethoxy-2,3-dihydro-4(1H)-quinazolinon, 2-(ethoxyphenyl)-8-trifluoromethyl-2,3-dihydro-4(1H)quinazolinone" should read --azolinones, 2-(1-naphthyl)-8-trifluoromethyl-2,3-dihydro-4(1H)-quinazolinone, 2-(1-naphthyl)-7-ethoxy-2,3-dihydro-4(1H)-quinazolinone, 2-(ethoxyphenyl)-8-trifluoromethyl-2,3-dihydro-4(1H)quinazolinone--.

Signed and sealed this 18th day of July 1972.

(SEAL)
Attest:

EDWARD M. FLETCHER, JR.
Attesting Officer

ROBERT GOTTSCHALK
Commissioner of Patents